May 31, 1966     D. A. ROGERS, JR     3,254,150

ELECTRICAL COILS FOR REFRIGERATING APPARATUS

Filed July 24, 1961

WITNESSES

INVENTOR
Dow A. Rogers, Jr.
BY
ATTORNEY

3,254,150
ELECTRICAL COILS FOR REFRIGERATING APPARATUS
Dow A. Rogers, Jr., Pittsburgh, Pa., assignor to Westinghouse Electric Corporation, East Pittsburgh, Pa., a corporation of Pennsylvania
Filed July 24, 1961, Ser. No. 126,097
4 Claims. (Cl. 174—17)

The present invention relates to insulated electrical conductors, windings, coils and the like. The invention includes the insulated articles, the method of insulating them, and a novel insulating tape employed in the insulating operation.

Up to about twenty years ago, shellac was employed as a binder for mica insulation on high voltage conductors. This type of insulation had many drawbacks, one being the brittleness of the shellac and its lack of flexibility, and another being the swelling of the insulation in use. Furthermore, the end turns of coils could not be treated or insulated with shellac and this led to many difficulties. Some of the problems were overcome by the use of high melting point asphalt as the binding agent for mica insulation. While this insulation was satisfactory in low temperature service, asphalt, being thermoplastic, exuded and bled from the coil end turns when the conductors were subjected to temperatures somewhat above 100° C. Asphaltic binders had the additional disadvantage that they inhibited polymerization of many impregnating resins used therewith.

More recently, improved insulation of high voltage electrical equipment has been effected by employing a mica tape or wrapper having a fluid resinous binder in conjunction with a covering layer of a solventless thermosetting resin. A particularly desirable insulation system has been described and claimed in U.S. Patent No. 2,656,290 to Berberich et al. That invention is directed to the use of completely reactive polyester resins wherein the final resin application is effected by vacuum impregnation followed by heat curing of the resin. The fluid resinous binder and the impregnating resin chemically co-react completely to create a single homogeneous chemical reaction product. The solid, voidless product so produced has excellent electrical insulating properties. In high voltage generators, for example, corona may occur and premature electrical breakdown will take place if the insulation possesses air pockets, voids or flaws. In other equipment, where no corona problems exist, solid voidless insulation is desirable since it prevents relative movement between conductors. Additional advantages of solid, voidless, insulation will be obvious to one skilled in the art.

The insulation system of Berberich et al. 2,656,290 like most other prior art methods, nonetheless requires a final resin impregnation with a liquid resin, and cure thereof to attain a satisfactory insulation system. The impregnation is ordinarily carried out under vacuum, requiring expensive initial investment and maintenance as well as extensive handling of the electrical apparatus in processing.

The Berberich et al. system, although possessing excellent electrical insulating properties, is relatively rigid and inflexible, once the conductor or coil is impregnated and cured. It is especially suitable to machines rated 6600 volts and above. These high voltage machines are normally assembled using half coils which are connected together at their ends after they are placed in the stator slots. If carefully molded in precision forms, the half coils may be inserted into the stator core slots without bending or distortion and the ends will match closely. In the intermediate voltage machines, rated 4800 volts and below, full coils are used. Full coils must be sufficiently flexible to permit bending and distortion as they are assembled into stators. The full coils would have to be impregnated and cured after positioning in the stator assembly. Otherwise, they would lack the flexibility necessary for assembly.

A more specific problem exists in manufacturing hermetic refrigeration motors. The insulation employed must be completely inert to the refrigerant used in the system. The commonly employed refrigerants are gaseous materials, polyhalogenated methanes and/or ethanes, such as dichlorodifluoromethane and trichlorofluoroethane. Unfortunately, many of the prior art insulating materials including the polyester resins have little resistance to the above refrigerants and may be dissolved so that the insulation is rendered useless after a few days exposure thereto. Moreover, insulated high voltage coils ordinarily incorporate an exterior coating of semiconducting and conducting paint. The painted surfaces must be in contact with the core iron to prevent corona damage. It is, therefore, impossible to employ an impregnation system applied to the coils after they are put in the machine inasmuch as the conducting paint, obviously, could not contact the iron if the coil were covered with a layer of resin.

Accordingly, it is a primary object of the present invention to provide an improved flexible insulation system adapted for use in the manufacture of electrical conductors, windings, coils and the like for intermediate voltage machinery.

A further object of the invention resides in the provision of a novel, flexible insulation system that obviates the need for an impregnating resin.

A still further object is to provide a novel mica tape comprising a specific viscous liquid epoxy resin.

Another object resides in the provision of a novel electrical insulation which is inert to conventional halogenated refrigerants.

Other objects will in part be obvious and will in part appear hereinafter.

The invention will be described in detail with particular reference to the accompanying drawing, in which.

Figure 1:
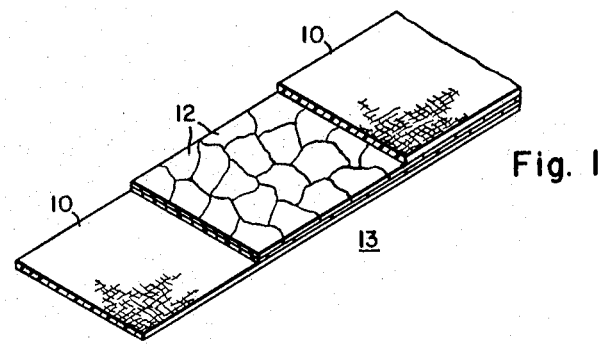
FIGURE 1 is a fragmentary view in perspective of a tape having mica flakes disposed between backing members and fully loaded with binder.

Generally, this invention relates to a composition of matter comprising a mica tape formed from a layer of a micaceous material such as flakes of mica, mica paper, or the like, supported by a pliable fibrous or sheet backing and impregnated and coated with a mixture of ingredients including (1) a viscous liquid epoxide resin having reactive epoxy groups, an average molecular weight of 350 to 4000 and an epoxy equivalent of from about 175 to 4000 and (2) a suitable catalyst to promote the polymerization of the epoxide resin to a thermoset state. The novel mica tape may be referred to as being fully loaded. This term means that the resinous binder is capable of forming an infusible thermosetting homopolymer either by self-condensation or by addition polymerization with or without catalysts under suitable curing conditions. A catalyzed system is preferred. This is in direct contrast to prior art concepts wherein the binding agents relied on a separate, externally introduced impregnating resin to develop co-polymerization. The resulting tape is applicable to electrical machine windings without recourse to any impregnating treatment.

The resinous epoxy compositions which are employable in this invention may be prepared, in accordance with one preferred procedure, by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxyl groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), and 4,4'-dihydroxy-diphenyl-methane.

While it is preferred to use epichlorohydrin as the epihalohydrin in the preparation of the resinous polymeric epoxide of the present invention, homologues thereof, for example, epibromohydrin and the like also may be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The product of the reaction, instead of being a single simple compound, is generally a complex mixture of glycidyl polyethers, but the principal product may be represented by the formula:

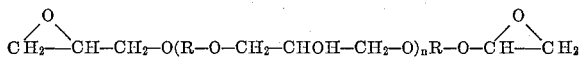

wherein $n$ is an integer of the series 0, 1, 2, 3 and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol has an average number of epoxide groups greater than 1.0 in the average molecule of the glycidyl ether. Owing to the method of preparation of the glycidyl polyethers and the fact that they are ordinarily mixtures of chemical compounds having somewhat different molecular weights and contain some compounds wherein the terminal glycidyl radicals are in hydrated form, the average number of epoxide groups in the average molecule of the product is not necessarily the integer 2.0. However, in all cases, it is a value greater than 1.0 It is thus a value between 1.0 and 2.0. The epoxide or epoxy equivalent is determined by dividing the average molecular weight by the average number of epoxide groups in the average molecule.

The number of epoxide groups in the glycidyl polyether is determined by heating a weighted sample of the ether with an excess of 0.2 N pyridinium chloride in chloroform solution at the boiling point under reflux for two hours whereby the pyridinium chloride hydrochlorinates the epoxy groups to the chlorohydrin groups. After cooling, the excess pyridinum chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to ten mol proportions of an epihalohydrin, preferably epichlorohydrin, with from one to three mol proportions of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending on the quantity of reactants used.

Upon completion of heating, the reaction mixture separates into layers. The upper aqueous layer is withdrawn and discarded, and the lower layer, containing the desired epoxy, is washed with hot water to remove unreacted alkali and halogen salts, in this case, sodium chloride. If desired, dilute acids, for example, acetic acid or hydrochloric acid, may be employed during the washing procedure to neutralize the excess alkali.

It will be understood that other processes for preparing epoxy resins may be employed. Hereinafter the term "epoxy resin" or "epoxide resin" designates such reactive compositions having an epoxy equivalent of from 175 to 4000.

In order to indicate more specifically the advantages and capabilities of the present invention, the following examples are set forth:

EXAMPLE I

A solution is prepared by dissolving 15 parts of a complex epoxide resin having a Durran's mercury melting point of 40–45° C., an epoxide equivalent of 300–375 and an average molecular weight of 710 and 85 parts of an epoxide resin having a Durran's mercury melting point of 20–28° C., an epoxide equivalent of 225–290 and an average molecular weight of 469 in methyl ethyl ketone to yield a solution of 60% solids. Ten parts of an amine-polyborate-ester per 100 parts of total epoxide resins is added as a catalyst. Suitable amine-polyborate-ester catalysts are disclosed and claimed in U.S. Patent No. 2,941,981 to Elbling et al. and assigned to the assignee of the present invention. The resinous solution is applied to the glass fabric backing 10 of FIG. 1. A layer 12 of mica splittings is laid down in overlapping fashion on the resin impregnated backing. Additional resin is applied to the mica layer 12. If desired, a second layer of glass fabric backing 10 is laid on top of the composite. For many purposes, the use of a top and bottom fabric backing is desirable, though for some uses, only a single fabric backing is adequate. The tape is dried to remove the solvent. The resin content of the finished mica tape 13 is about 25%. The tape measures 0.006 inch in thickness.

Standard test bars were prepared with the foregoing tape. Four such bars were prepared by applying ¾-inch wide tape in half-lapped fashion. The wrapped test bars were cured at 150° C. for 12–16 hours to polymerize the resin binder. When heated the epoxy resin will flow and fill all the interstices in the applied tape wrapping. Thereafter, it will cure to a thermoset solid. It is desirable that the epoxy resin be not excessively fluid otherwise it may exude and drip out of the coil, nor should it be so viscous that it will not flow into spaces in the tape wrapping. Consequently, the molecular weights given are critical.

The following results were obtained:

Table I

| Test Bar | Ground Wall Thickness (1 side) | Dielectric Strength |
|---|---|---|
| 1 | 45 mils | 37.5 KV |
| 2 | 62 mils | 41.5 KV |
| 3 | 66 mils | 40.0 KV |
| 4 | 67 mils | 42.5 KV |

Test bar 1, for example, had a dielectric strength of over 830 volts/mil. The results are considered excellent.

Suitable epoxide resins to use in practicing the invention are sold under the name of Epon Resins by Shell Chemical Corp. and Epirez Resins by Jones-Dabney Co. Additional examples are illustrated in Table II, wherein blends of commercial resins are employed:

Table II

| Example | Resins | Proportions, Parts by weight | Avg. Mol. wt. | Epoxy Equiv. | Durran's Hg M.P., °C. |
|---|---|---|---|---|---|
| II | Epon 826 | 10 | 350–400 | 175–210 | 65–75 |
|  | Epon 1009 | 90 | 3,800 | 2,400–4,000 |  |
| III | Epon 828 | 20 | 375–400 | 175–210 | 30–40 |
|  | Epon 1001 | 80 | 900–1,000 | 2,400–4,000 |  |
| IV | Epon 834 | 15 | 450 | 225–290 | 20–25 |
|  | Epon 864 | 85 | 700 | 300–375 |  |
|  | SiO₂ filler (1 micron average size particles). | (¹) |  |  |  |
| V | Epirez 515 | 80 | 460 | 235–275 | 70–80 |
|  | Epirez 550 | 20 | 3,800 | 2,400–4,000 |  |

¹ 2-10% of resin.

A small amount of a resin converter or catalyst may be mixed with the resin prior to its use. Conventional catalysts or converters may be employed. Boron trifluoride is particularly satisfactory. In addition to the amine-polyborate-ester employed in Example I, polyamines, polybasic acids and anhydrides as well as the complex borate-titanate catalysts disclosed and claimed in U.S. Patent No. 2,809,184 may be used.

Catalysts comprising $BF_3$ were added to each of the resin compositions in Table II and 6-mil mica type was prepared as in Example I with from 20% to 40% resin applied thereto. All of the tapes were applied to test bars, cured by heating at 125° C. to 150° C., and when tested electrically excellent dielectric strength properties were obtained.

In Example IV of Table II, several compositions were prepared, containing from 2% to 10% of silica filler having an average particle size of 1 micron. Finely divided fillers can be added to the epoxy resins up to a maximum amount of about 10%, based on the weight of the epoxy resins. The larger proportions of up to 10% are added to the lower average molecular weight compositions to increase the viscosity so that the applied resin compositions do not exude from the tape on storage. Examples of other suitable finely divided fillers are alumina, zircon, calcium silicate, mica dust and aluminum silicates, and mixtures of two or more. The fillers should be finely divided preferably finer than 200 mesh.

Many epoxy resins, from low viscosity fluids to complete solids, are known in the art. All epoxy resins are not satisfactory binders for the micaceous tapes of this invention. Only those epoxy resins or resin blends which have a Durran's mercury melting point 20–80° C., after application to the tape and after solvent evaporation, are satisfactory. Resins outside of this range would either be too fluid to act as a binder or would be too rigid for the flexibility required in a tape or wrapping. The epoxy binder content should be from 20% to about 40% of the total weight of the tape. With the epoxy binder content above 40%, the resin run-out may cause the coiled tape to block during storage. With binder contents of lower than 20%, poor electrical insulation properties and incomplete resin fill would preclude the satisfactory use of the tape in intermediate voltage machines.

Although the fibrous backing 10 has been described as being glass fibers or cloth in the foregoing examples, it should be understood that other materials such as asbestos, polyethylene glycol terephthalate films or the like may also be used.

Figure 2:
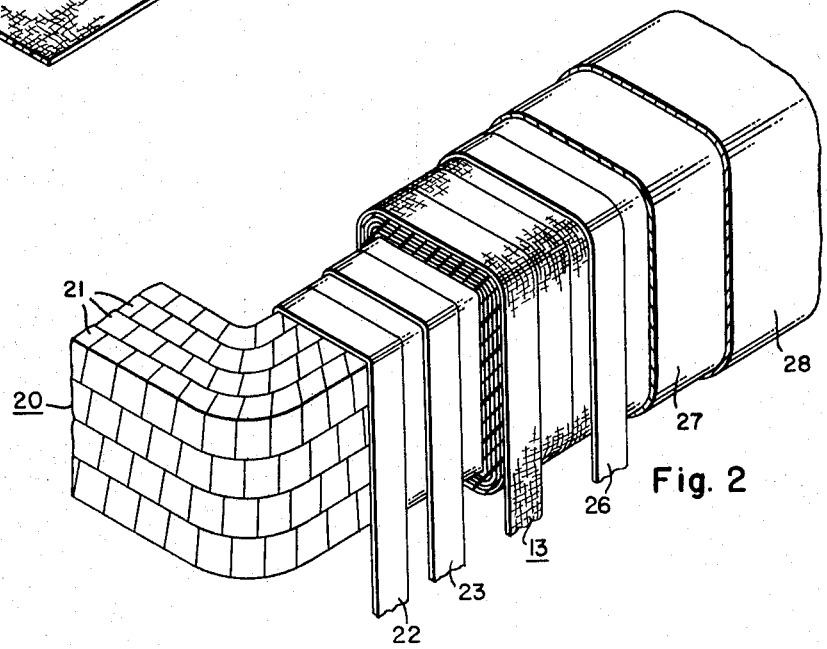
FIG. 2 is a fragmentary view in perspective of a coil convolutely wound with the tape of FIG. 1 as ground insulation; and, FIG. 3 is a plan view of a full coil constructed according to this invention.
Figure 3:
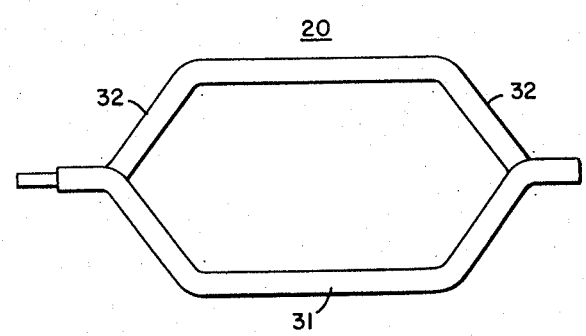

In carrying out the novel method of insulating electrical conductors, coils and the like, a stator coil 20 is first prepared by conventional means. Referring to FIGURE 2, enameled rectangular copper wire is double wound with glass serving 21 and varnished. A shuttle coil 20 is formed from a plurality of turns and formed to shape as shown in FIGURE 3. The coil is thereafter bound with glass tape 22 impregnated with a "B" stage epoxy resin which may be any of the epoxy resins described previously. The coil 20 is then completely wrapped with unimpregnated glass tape 23. The slot, or flat portion, 31 of the coil is placed in a suitable press and the resin of this coil is cured under heat and pressure so as to reduce the slot portion to a compacted shape of proper length and straightness.

The coil is then convolutely wrapped with, preferably, about 6 layers of the novel mica tape 13 such as that of Example I, applied in half-lapped fashion. The tape 13 may suitably comprise backing layers consisting of woven glass cloth from 1 to 2 mils thick, and layers of a micaceous material, such as mica flakes or the so-called mica paper, 2 mils thick, and of a total thickness of 6 mils. The mica flakes may be of an average diameter of ½-inch and greater. The mica paper may comprise extremely fine mica flakes, of powdered form, as for example that disclosed in U.S. Patent 2,614,055.

It should be noted that coils for hermetic refrigeration motors are wrapped with a tape wherein the micaceous material is the so-called mica paper. It is essential that mica paper be used in this construction because of its permeability which permits the taped coils to withstand sudden decompression. When such coils are insulated with large mica splittings in place of mica paper, excellent coils are produced. However, when such coils are exposed to sudden decompression, i.e. 200 p.s.i. to 1 atmosphere in seconds, the ground wall often will swell due to small amounts of entrained volatiles which the impermeability of the large mica flake prevents ready escape.

The tape contains about 30% of catalyzed epoxy resin as described heretofore based on the total weight of the tape. The coil is again wrapped with a half-lapped layer of epoxy resin impregnated glass tape 26, 5 mils thick. Thereafter, the slot portion 31 of the wound coil is press cured on all four sides. The end turns, or diamonds 32, are uncured. A coating of a conducting paint is applied to the coil as illustrated at 27. At some points an overlapping layer of semiconducting paint is applied thereover as shown at 28. Since the end turns, or diamonds 32, are uncured at this point, the coils will be sufficiently flexible so that they may be distorted in the stator assembly operation. After the stator is assembled, it is inserted into an oven heated to about 150° C. The resin in the end turns is cured over a baking cycle of about 12-16 hours. At the end of this time, the resin in the diamonds 32 is cured to an infusible thermoset condition.

The stator assembly may then be incorporated into a hermetically sealed motor, the mica paper epoxy binder combination being especially suitable for the application. The housing is sealed with a polyhalogenated refrigerant therein, the insulated coils being exposed to an atmosphere of the refrigerant gas. Such motors are used in air conditioning apparatus, and the like.

For many purposes, half coils, straight electrical conductors, and magnetic coils may be wrapped with a mica tape containing the epoxy resin and can be heated with or without pressure, to produce fully cured, resin bonded insulation. In some cases, the conductors wrapped with the tape containing the uncured resin can be placed in electrical equipment with the entire apparatus being heated to cure the resin.

As stated hereinbefore, electrical equipment provided with such an insulation system is completely inert to the commonly employed hermetic refrigerants. The invention, therefore, presents to the art a novel and greatly improved electrical insulation.

Although the invention has been described with particular reference to the foregoing examples, it is to be understood that certain changes may be made without departing from the spirit thereof.

I claim as my invention:

1. In a sealed apparatus containing a compressible polyhalogenated refrigerant, an insulated electrical coil comprising a conductor having insulation wrapped thereabout, the insulation comprising at least one sheet of pliable base material, a layer of mica paper disposed upon the sheet and a thermoset binder joining the sheet and mica paper together, the binder consisting essentially of from 20% to 40% based on the total weight of the insulation and consisting essentially of thermoset epoxy resin and up to 10% of finely divided filler, by weight of the resin, the thermoset epoxy resin being derived from a catalyzed fluid epoxy resin having a melting point from 20° C. to 80° C., an average molecular weight of from 350 to 4000 and an epoxy equivalent of 175 to 4000.

2. In a sealed apparatus containing a compressible polyhalogenated refrigerant, an insulated electrical coil comprising a conductor having insulation wrapped thereabout, the insulation comprising at least one sheet of pliable base material, a layer of mica paper disposed upon the sheet and a thermoset binder joining the sheet and mica paper together, the binder consisting essentially of from 20% to 40% based on the total weight of the insulation and consisting essentially of thermoset epoxy resin and up to 10% of finely divided filler, by weight of the resin, the thermoset epoxy resin being derived from a catalyzed fluid epoxy resin having a melting point from 20° C. to 80° C., an average molecular weight of from 350 to 4000 and an epoxy equivalent of 175 to 4000, a layer of conducting paint disposed over said micaceous insulation and a layer of semiconducting paint disposed over said conducting paint.

3. In a refrigerating apparatus including in combination, a sealed housing, an atmosphere comprising a polyhalogenated refrigerant and an electrical conductor in the housing exposed to said atmosphere, the improvement comprising micaceous insulation wrapped about said conductor, the insulation comprising at least one sheet of pliable base material, a layer of mica paper disposed upon the sheet and a thermoset binder joining the sheet and mica paper together, the binder consisting essentially of from 20% to 40%, based on the total weight of the insulation and consisting essentially of thermoset epoxy resin and up to 10% of finely divided filler, by weight of the resin, the thermoset epoxy resin being derived from a catalyzed fluid epoxy resin having a melting point from 20° C. to 80° C., an average molecular weight of from 350 to 4000 and an epoxy equivalent of 175 to 4000.

4. In a refrigerating apparatus including, in combination, a sealed housing, an atmosphere comprising a polyhalogenated refrigerant and an electrical conductor in the housing exposed to said atmosphere, the improvement comprising micaceous insulation wrapped about said conductor, the insulation comprising at least one sheet of pliable base material, a layer of mica paper disposed upon the sheet and a thermoset binder joining the sheet and mica paper together, the binder consisting essentially of from 20% to 40%, based on the total weight of the insulation and consisting essentially of thermoset epoxy resin and up to 10% of finely divided filler, by weight of the resin, the thermoset epoxy resin being derived from a catalyzed fluid epoxy resin having a melting point from 20° C. to 80° C., an average molecular weight of from 350 to 4000 and an epoxy equivalent of 175 to 4000, a layer of conducting paint disposed over said micaceous insulation and a layer of semiconducting paint disposed over said conducting paint.

References Cited by the Examiner

UNITED STATES PATENTS

| | | | |
|---|---|---|---|
| 2,613,238 | 10/1952 | Wieseman | 310—215 |
| 2,656,290 | 10/1953 | Berberich et al. | 174—120.4 |
| 2,707,204 | 4/1955 | Richardson et al. | 174—110 |
| 2,713,715 | 7/1955 | Jenner et al. | 29—155.57 |
| 2,780,742 | 2/1957 | Jenner et al. | 310—179 |
| 2,847,343 | 8/1958 | Kohn | 161—184 X |
| 2,917,570 | 12/1959 | Wolff et al. | 174—120 |
| 2,935,859 | 5/1960 | Marvin | 310—45 X |
| 2,956,613 | 10/1960 | Edelman et al. | 174—110.9 |
| 2,970,936 | 2/1961 | Richardson | 29—155.5 |
| 3,071,496 | 1/1963 | Fromm et al. | 117—218 |
| 3,110,299 | 11/1963 | Fox | 264—110 |
| 3,146,300 | 8/1964 | Beckius et al. | 174—120 X |

FOREIGN PATENTS 852,150   10/1960   Great Britain.

OTHER REFERENCES

"Epoxy Resin," by Steist, pages 18, 19 and 22–24 relied upon.

WHITMORE A. WILTZ, *Primary Examiner.*

JOHN P. WILDMAN, JOHN F. CAMPBELL,
*Examiners.*

K. R. PETERSON, R. W. CHURCH,
*Assistant Examiners.*